United States Patent
Weissert et al.

(10) Patent No.: US 8,255,105 B2
(45) Date of Patent: Aug. 28, 2012

(54) STEERING DEVICE, BOARDING TYPE MOVING BODY WITH STEERING DEVICE, AND STEERING METHOD FOR MOVING BODY

(75) Inventors: Michael Weissert, Nagoya (JP); Takashi Izuo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 727 days.

(21) Appl. No.: 12/245,423

(22) Filed: Oct. 3, 2008

(65) Prior Publication Data

US 2009/0093929 A1    Apr. 9, 2009

(30) Foreign Application Priority Data

Oct. 5, 2007   (JP) ................................ 2007-261595

(51) Int. Cl.
*G05D 3/10* (2006.01)
*B62D 37/00* (2006.01)

(52) U.S. Cl. .......................................... 701/22
(58) Field of Classification Search ...................... 701/22
See application file for complete search history.

(56) References Cited

U.S. PATENT DOCUMENTS

| | | | | |
|---|---|---|---|---|
| 5,971,091 A * | 10/1999 | Kamen et al. | ................. | 180/218 |
| 6,302,226 B1 * | 10/2001 | Kanno et al. | ................. | 180/6.5 |
| 2003/0160761 A1 * | 8/2003 | Wu | ................................ | 345/161 |
| 2005/0195166 A1 * | 9/2005 | Cooper et al. | ................. | 345/161 |
| 2008/0055241 A1 * | 3/2008 | Goldenberg et al. | ......... | 345/156 |

FOREIGN PATENT DOCUMENTS

| | | |
|---|---|---|
| JP | H05-021938 U | 3/1993 |
| JP | H06-304205 A | 11/1994 |
| JP | H06-309095 A | 11/1994 |
| JP | 8-281584 | 10/1996 |
| JP | 09-248320 A | 9/1997 |
| JP | 10-165449 A | 6/1998 |
| JP | 2000-060904 A | 2/2000 |
| JP | 2002-032172 A | 1/2002 |
| JP | 2003-134614 A | 5/2003 |
| JP | 2003-183000 A | 7/2003 |
| JP | 2005-059695 A | 3/2005 |
| JP | 2005-306184 A | 11/2005 |
| JP | 2006-006859 A | 1/2006 |
| JP | 2007-118806 A | 5/2007 |
| JP | 2007-143788 A | 6/2007 |

* cited by examiner

*Primary Examiner* — Paul N Dickson
*Assistant Examiner* — Wesley Potter
(74) *Attorney, Agent, or Firm* — Kenyon & Kenyon LLP

(57) ABSTRACT

A steering device for steering a moving body has: an operating part; a detecting part that detects a physical quantity based on a magnitude and direction of a force applied to the operating part; and a controller that drives the moving body based on the physical quantity detected by the detecting part and controls an amount of movement and a direction of movement of the moving body. The controller has a dead zone for controlling the amount of movement without receiving influence of the magnitude of the physical quantity until the physical quantity detected by the detecting part exceeds a predetermined threshold value, and determines the threshold value in accordance with a moving speed of the moving body.

23 Claims, 10 Drawing Sheets

STEERING DEVICE, BOARDING TYPE MOVING BODY WITH STEERING DEVICE, AND STEERING METHOD FOR MOVING BODY

INCORPORATION BY REFERENCE

The disclosure of Japanese Patent Application No. 2007-261595 filed on Oct. 5, 2007, including the specification, drawings and abstract is incorporated herein by reference in its entirety.

BACKGROUND OF THE INVENTION

1. Field of the Invention

The invention relates to a steering device for steering a moving body, a moving body having the steering device, and a steering method of steering the moving body.

2. Description of the Related Art

There is a conventional circular steering device (handle) used in a general vehicle as a steering device for controlling the direction or amount of movement (speed, acceleration) of a moving body. This steering device not only determine the amount of movement in relation to the amount of operation carried out by an operator, but also determines the direction of movement of the moving body based on a steering direction. Such a circular steering device is connected directly to a steering rack by means of a mechanical link so as to convert a circular operation of the steering device to a linear motion. Therefore, this steering device is restricted in term of the design, as it has to be provided with sufficient rigidity and designed with safety in mind when incorporated into a vehicle.

Therefore, as a steering device for use in operating small vehicles such as a wheelchair and a cart, a work machine and the like, a steering device that has a simple structure in terms of its operability and internal space is often used. Specifically, there is generally known a joystick steering device for operating a rod-like lever or hand rim-like operating element to perform steering. Such a joystick steering device is disclosed in Japanese Patent Application Publication No. 2005-306184 (JP-A-2005-306184), Japanese Patent Application Publication No. 8-281584 (JP-A-8-281584), and Japanese Patent Application Publication No. 2000-60904 (JP-A-2000-60904).

For example, the steering device disclosed in JP-A-2005-306184 is configured to detect right and left steering angles of a joystick operated by an operator, controls a drive amount of a wheel in accordance with the detected steering angles, and applies a steering reaction force to the joystick in accordance with the detected steering angles. Accordingly, a moderate resistance is applied to a return operation when returning the joystick, so that the operator can perform a delicate operation as intended when returning the joystick.

The steering device disclosed in JP-A-8-281584, which is used in a measuring device or a working machine, a certain range of the amount of operation of the joystick is considered a dead zone on software. As a method of determining the width of the dead zone, this invention uses a method of sampling, in a certain sampling cycle, a voltage signal that is output in accordance with a swing angle of the joystick, comparing a changing quantity of the voltage signal per sampling cycle with a predetermined threshold value, and neglecting the dead zone when the changing quantity exceeds the threshold value.

The invention disclosed in JP-A-2000-60904 describes a steering device used in an electric wheelchair. In this invention, right and left hand rims are used as a steering device in place of a joystick steering device to control wheels of the wheelchair by rotating these hand rims. Accordingly, the operability for controlling the moving speed and the like can be enhanced.

However, each of the technologies disclosed in these publications is used for determining the amount of movement in relation to the amount of operation performed by the operator, and therefore it is not necessarily true that the movement is controlled by an intuitive operation performed by the operator.

Therefore, considered is use of a steering device that is capable of controlling a movement based on a force applied by an operation of an operator and thereby controlling a movement of a moving body by performing an intuitive operation. However, the problem of such a steering device is that, in spite of its high responsiveness for promptly responding to the force applied by the operator, it is difficult to perform a delicate operation for controlling a direction and an amount of movement.

Thus, if the dead zone is set large in relation to the force applied by the operator, the responsiveness for eliminating a response to an applied small force is degraded, but at the same time when the dead zone is set low, sufficient operability cannot be achieved.

SUMMARY OF THE INVENTION

An object of the invention is to provide a steering device for steering a moving body, the steering device being capable of controlling a movement by means of an intuitive operation performed by an operator and securing sufficient responsiveness and operability in order to control the movement. The object of the invention is also to provide a moving body having the steering device, and a steering method of steering the moving body.

A first aspect of the invention relates to a steering device for steering a moving body having moving means. This steering device has an operating part, a detecting part that detects a physical quantity based on magnitude and direction of a force applied to the operating part, and a controller that drives the moving means based on the physical quantity detected by the detecting part and controls an amount of movement of the moving body. The controller has a dead zone for controlling the amount of movement without receiving influence of the magnitude of the physical quantity until the physical quantity detected by the detecting part exceeds a predetermined threshold value, and further determines the threshold value in accordance with a moving speed of the moving body.

In the steering device that controls a movement of a moving body on the basis of an applied force, the sensible speed which the operator feels, i.e., the moving speed of the moving body, makes a significant difference in the force applied by the operator. Therefore, by appropriately selecting and determining the threshold value for defining the width of the dead zone in accordance with the moving speed of the moving body, variations in operational forces obtained at operator's different sensible speeds can be absorbed. After the variations in the operational forces of the operator is reduced, when the operator moves the moving body by an intuitive operation sufficient responsiveness and operability can be secured by controlling the movement of the moving body in accordance with the force applied by the operator. "The amount of movement" described in the invention means not only the distance in which the moving body moves in a traveling direction, but also the changing amount of the direction, which is a rotational angle (rotational amount) of a steering obtained by a normal steering operation.

In the steering device, when the physical quantity of equal to or more than the threshold value is input to the controller, the steering device may control the amount of movement without receiving influence of the magnitude of the physical quantity until the speed of the moving body reaches a certain speed from a stopping state. It is generally known that, when experimentally extracting operational forces of a plurality of operators during the initial stage of the movement (the time between the start of the movement and when the speed of the moving body reaches the certain speed), there are significant gaps among the operational forces applied by the operators. Therefore, for example, the width of the dead zone is set wide for the period of time between when the moving body starts moving and when the speed of the moving body reaches the certain speed, to control the moving speed without receiving influence of the magnitude of the physical quantity. Moreover, after the speed of the moving body reaches the certain speed, when the operator controls the moving body by an intuitive operation more sufficient responsiveness and operability can be secured by controlling the amount of movement of the moving body in accordance with the physical quantity based on the force applied by each operator.

In a case in which the physical quantity of equal to or greater than a predetermined magnitude is input to the controller for at least a predetermined time period when the moving body moves at a predetermined speed or higher, the steering device may control the amount of movement to keep the speed of the moving body at a predetermined rate. Specifically, when controlling the amount of movement by means of the operational force, continuously applying a force to the operating part for a long time increases the operation load of the operator. Therefore, when the operational force is applied for at least a certain time period, the amount of movement can be controlled to keep the speed at a predetermined rate so that the operation load of the operator can be reduced. This control, i.e., the control for keeping the speed at a predetermined rate, may apply a drive force to compensate the deceleration caused by a friction or the like of the moving body.

The control for keeping the speed of the moving body at a predetermined rate may be continued until the operator applies an operational force in a direction of deceleration (direction opposite to the direction in which the moving body moves). In other words, the amount of movement may be controlled to keep the speed of the moving body at a predetermined rate until the physical quantity of equal to or greater than a predetermined value is input to the controller in a direction opposite to a direction in which the moving body moves.

The physical quantity may include an integration value of the force applied to the operating part. By controlling the amount of movement of the moving body on the basis of the integration value of the force applied to the operating part, the operation performed by the operator on a sensory level matches with the movement of the moving body, whereby the operator can securely move the moving body by the operator's intuitive operation.

Moreover, the controller may be able to control the amount of movement and the direction of movement based on a value obtained by multiplying the input physical quantity by a specific gain and then change the magnitude of the gain in accordance with a speed at which the moving body moves. Here, when the input physical quantity is equal to or greater than a certain magnitude, for example, the controller may change the gain more significantly as the speed of the moving body becomes higher. As a result, the responsiveness of the rotational angle (steering angle) that is obtained at the time of moving at high speeds can be improved, and therefore the effect of an easy operation that can avoid obstacles during a high-speed operation can be achieved.

The operating part may have a graspable rod-like member that is fixed to the detecting part via an elastic body, and may be a so-called joystick steering device in which the detecting part detects the physical quantity based on a magnitude and a direction of a force applied to the elastic body by operating the rod-like member. The steering device with such a configuration is preferred because it can lead to a control for securely steering the operational force applied by the operator.

Note that, in the steering device that is configured as described above, the controller may perform control to stop the moving body when the force of equal to or greater than a certain magnitude is applied in a length direction of the operating part. Accordingly, in the case of the joystick steering device, the moving body can be brought to an emergency stop (sudden braking) when performing an emergency stop, without the need for operating means for performing an emergency stop.

Moreover, in such a steering device, a surface of the operating part may be provided with a body sensor as the means for determining whether to stop the moving body. By determining whether to stop the moving body on the basis of a signal acquired from the body sensor, it becomes possible to reduce a delay in a stop timing that affects a delay in the operation performed by the operator.

A second aspect of the invention relates to a boarding type moving body that can be operated by an operator operating the steering device. This boarding type moving body has: moving means; an operating part that is operated by the operator; a detecting part that detects a physical quantity based on magnitude and direction of a force applied to the operating part; and a controller that drives the moving means based on the physical quantity detected by the detecting part and controls an amount of movement of the moving body. The controller has a dead zone for controlling the amount of movement without receiving influence of the magnitude of the physical quantity until the physical quantity detected by the detecting part exceeds a predetermined threshold value, and further determines the threshold value in accordance with a moving speed of the moving body.

In such a boarding type moving body, by appropriately selecting and determining the threshold value for defining the width of the dead zone in accordance with the moving speed of the moving body, variations in operational forces obtained at operator's different sensible speeds can be absorbed. After the variations in the operational forces of the operator is reduced the movement of the moving body can be controlled in accordance with the force applied by the operator, and when the operator moves the moving body by an intuitive operation sufficient responsiveness and operability can be secured.

The physical quantity may include an integration value of the force applied to the operating part. By controlling the amount of movement of the moving body on the basis of the integration value of the force applied to the operating part, the operation performed by the operator on a sensory level matches with the movement of the moving body, whereby the operator can securely move the moving body by the operator's intuitive operation.

In the boarding type moving body, when a physical quantity of equal to or more than the threshold value is input to the controller, the steering device may control the amount of movement without receiving influence of the magnitude of the physical quantity, until the speed of the moving body reaches a certain speed from a stopping state. For example, the width of the dead zone is set wide for the period of time between when the moving body starts moving and when the speed of the moving body reaches the certain speed, to control the moving speed without receiving influence of the magnitude of the physical quantity. Moreover, after the speed of the moving body reaches the certain speed, when the operator controls the moving body by an intuitive operation more sufficient responsiveness and operability can be secured by controlling the amount of movement of the moving body in accordance with the physical quantity based on the force applied by each operator.

In a case in which a physical quantity of equal to or more than a predetermined magnitude is input to the controller for at least a predetermined time period when the boarding type moving body moves at a predetermined speed or lower, the amount of movement may be controlled to keep the speed of the moving body at a predetermined rate. When the operational force is applied for at least a certain time period, the amount of movement can be controlled to keep the speed at a predetermined rate so that it is possible to reduce the operation load that is obtained by applying the operational force for a long time. This control for keeping the speed at a predetermined rate, may apply a drive force to compensate the deceleration caused by a friction or the like of the moving body.

In the boarding type moving body, the controller may control the amount of movement controlled to keep the speed of the moving body at a predetermined rate until a physical quantity of equal to or greater than a predetermined value is input to the controller, the physical quantity corresponding to the direction opposite to the direction in which the moving body moves.

The controller may be able to control the amount of movement and the direction of movement based on a value obtained by multiplying the input physical quantity by a specific gain and then change the magnitude of the gain in accordance with a speed at which the moving body moves. For example, the controller may change the gain more significantly as the speed of the moving body becomes higher. Consequently, the responsiveness of the rotational angle (steering angle) that is obtained at the time of moving at high speeds can be improved, and therefore the effect of an easy operation that can avoid obstacles during a high-speed operation can be achieved.

The operating part may have a graspable rod-like member that is fixed to the detecting part via an elastic body, and may be a so-called joystick operating part in which the detecting part operates the rod-like member to detect the physical quantity based on the magnitude and direction of a force that is applied to the elastic body. The operating part with such a configuration can lead to a control for securely steering the operational force applied by the operator.

In addition, the controller may stop the moving body, when a force of equal to or greater than a certain magnitude is applied in a length direction of the operating part. Accordingly, an emergency stop (sudden braking) can be performed without the need for operating means for performing an emergency stop.

Moreover, the surface of the operating part may be provided with a body sensor, and the controller may determine whether to stop the moving body on the basis of a signal acquired from the body sensor. By determining whether to stop the moving body on the basis of the signal acquired from the body sensor, it becomes possible to reduce a delay in a stop timing that affects a delay in the operation performed by the operator.

Although the form of the moving means is not particularly limited, it may be a wheel-type moving means that is moved by an applied torque. This wheel-type moving means allows not only smooth acceleration and deceleration, but also high-speed movement. Therefore, it is important to secure sufficient responsiveness and operability when moving the moving body based on the operator's intuitive operation, so that even more significant effect can be achieved when applying the invention.

A third aspect of the invention relates to a steering method of steering a moving body having moving means. This steering method has: detecting a physical quantity based on a magnitude and a direction of a force applied to an operating part; comparing whether the detected physical quantity exceeds a predetermined threshold value; a first control step of, in a case in which the detected physical quantity does not exceed the threshold value, driving the moving means and controlling an amount of movement and a direction of movement of the moving body without receiving influence of a magnitude of the physical quantity; a second control step of, in a case in which the detected physical quantity exceeds the threshold value, driving the moving means on the basis of the physical quantity to control the amount of movement and the direction of movement of the moving body; acquiring a speed at which the moving body moves; and determining a magnitude of the threshold value in response to the acquired speed.

According to this steering method, by appropriately selecting and determining the threshold value for defining the width of the dead zone in accordance with the moving speed of the moving body, variations in operational forces obtained at operator's different sensible speeds can be absorbed. After the variations in the operational forces of the operator is reduced the movement of the moving body can be controlled in accordance with the force applied by the operator, and when the operator moves the moving body by an intuitive operation sufficient responsiveness and operability can be secured.

The control steps for controlling the amount of movement and the direction of movement based on a value obtained by multiplying the input physical quantity by a specific gain may further have a gain changing step of changing the magnitude of the gain in accordance with a speed at which the moving body moves. According to this steering method, for example, the controller may change the gain more significantly as the speed of the moving body becomes higher. Consequently, the responsiveness of the rotational angle (steering angle) that is obtained at the time of moving at high speeds can be improved, and therefore the effect of an easy operation that can avoid obstacles during a high-speed operation can be achieved.

This steering method may further have a step of determining whether the moving body moves at a speed of equal to or higher than a predetermined speed, and a third control step of controlling the amount of movement to keep the speed of the moving body at a predetermined rate, when determination is made that the moving body moves at the speed equal to or higher than the predetermined speed and when the physical quantity of equal to or greater than a predetermined magnitude is input to the controller for at least a predetermined time period. When the operational force is applied for at least a certain time period, the amount of movement can be controlled to keep the speed at a predetermined rate so that it is possible to reduce the operation load that is obtained by applying the operational force for a long time. This control for keeping the speed at a predetermined rate, may apply a drive force to compensate the deceleration caused by a friction or the like of the moving body.

As described above, the invention can provide a steering device for steering a moving body, the steering device being capable of controlling a movement by means of an intuitive operation performed by an operator and securing sufficient responsiveness and operability in order to control the movement. The object of the invention is also to provide a moving body having the steering device, and a steering method of steering the moving body.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering device and a moving body having the steering device according to a first embodiment of the invention are now described with reference to FIGS. 1 to 9.

Figure 1:
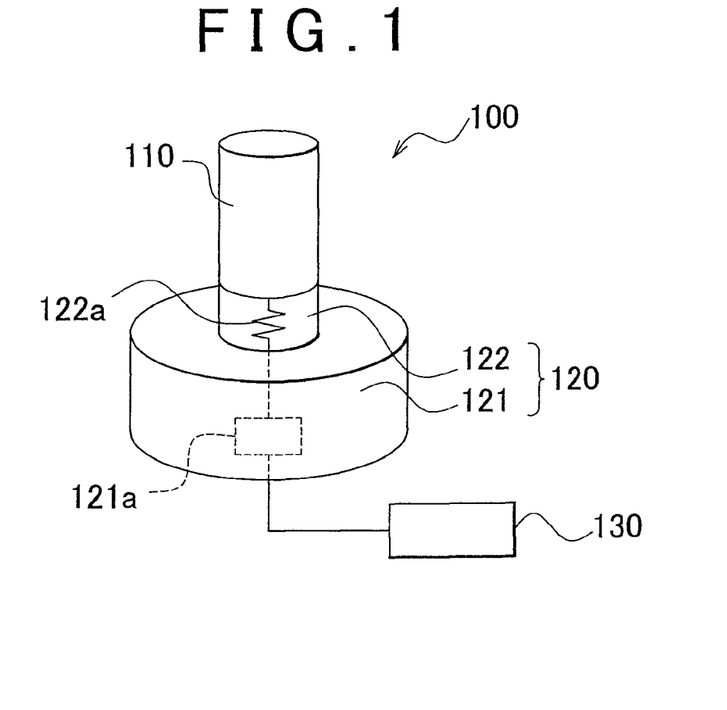
FIG. 1 is a diagram showing a steering device according to a first embodiment of the invention.
Figure 2:
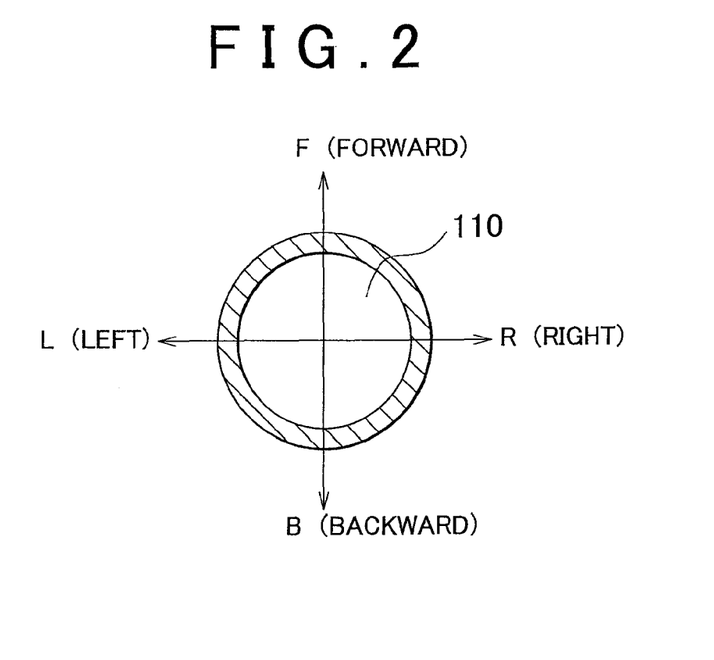
FIG. 2 is a schematic diagram showing an operating part of the steering device of FIG. 1 from directly above.

FIG. 1 is a diagram showing a steering device 100 according to the first embodiment of the invention. The steering device 100 has an operating part 110 operated by an operator, a base part 120 for supporting the operating part 110, and a controller 130 for controlling the amount of movement and the direction of movement of a moving body (not shown) corresponding to a steering target. The base part 120 has a base part main body 121, and an elastic body 122 for supporting the operating part 110 on the base part main body 121.

The operating part 110 has a rod-like member that extends in a vertical direction with respect to a paper surface. One end (lower end) of the rod-like member is fixed to the base part main body 121 via the elastic body 122 in a substantially vertical direction. The operator can deform the elastic body 122 by holding the rod-like member and inclining it in a specific direction with respect to the base part main body 121. For example, in FIG. 2 that shows the operating part 110 from directly above, changing the direction of inclination of the rod-like member to a forward direction (direction of the arrow F in FIG. 2), a rearward direction (direction of the arrow B), a right-hand direction (direction of the arrow R) or a left-hand direction (direction of the arrow L) deforms the elastic body in accordance with the changed direction and the degree of inclination.

The elastic body 122, not shown, is configured by a conventional material such as a reinforced rubber or a spring. In the elastic body 122, measuring means 122$a$ corresponding to a kinetic sensor (e.g., a deformation gauge) for measuring a direction of deformation and degree of deformation is embedded. The base part main body 121 has a detector 121$a$ for detecting the magnitude and direction of an operational force applied to the elastic body. The abovementioned magnitude and direction of the operational force are detected by using the detector 121$a$ embedded in the base part main body 121 to receive a signal related to the direction of deformation and the degree of deformation that are obtained from the measuring means 122$a$. The elastic body with the measuring means such as a deformation gauge and the detector can be considered as the detecting part of the invention.

Figure 3:
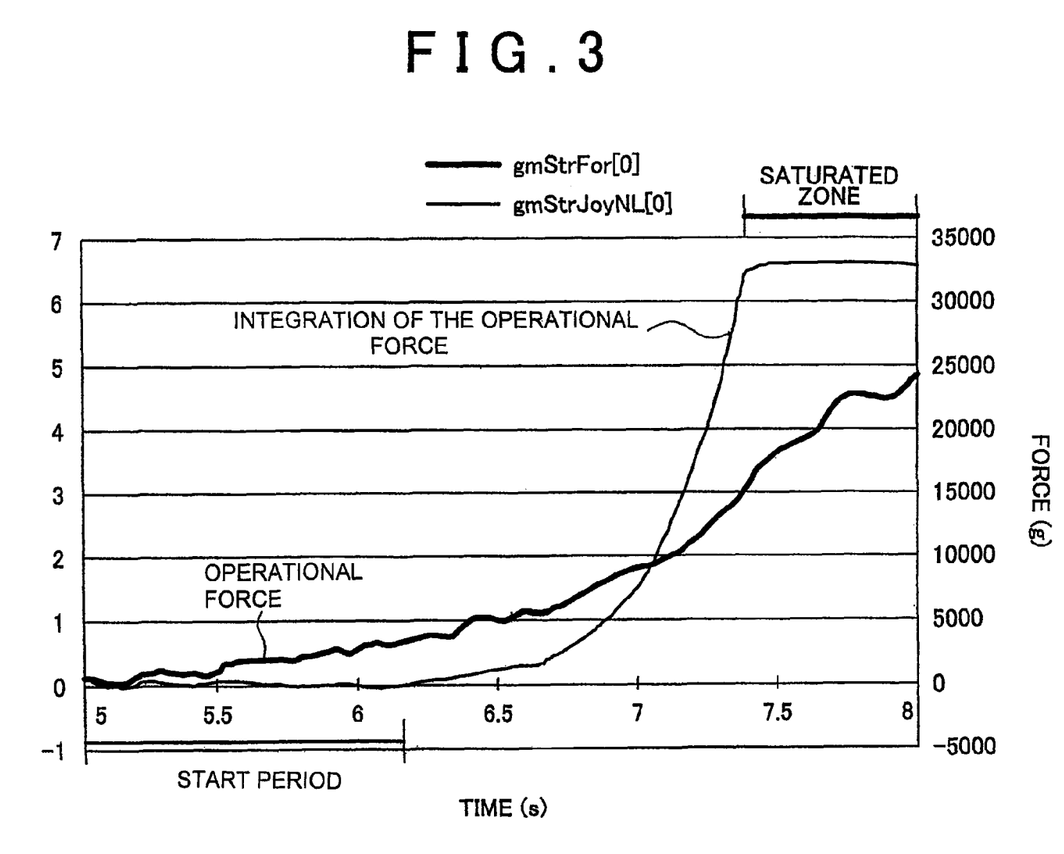
FIG. 3 is a graph showing an example of converting a magnitude F of an operational force detected in the steering device shown in FIG. 1.

The controller 130 is constituted by a computer that converts the magnitude of the detected operational force to the amount of movement and then outputs signals indicative of the converted amount of movement and the direction of movement. Specifically, the controller 130 receives an input of the magnitude of the operational force detected by the detector and then converts the magnitude of the operational force to a physical quantity for controlling the amount of movement of the moving body. As the physical quantity obtained as a result of the conversion, for example, an integration value of the magnitude F of the operational force measured by the deformation gauge ($=\int F \Delta t$) is used. FIG. 3 is a graph showing an example of converting the magnitude F of the detected operational force to the integration value ($=\int F \Delta t$). The controller 130 outputs a value obtained by multiplying the converted value by a predetermined gain, along with a direction in which the operation is performed, as control signals for controlling the amount of movement of the moving body. Note that the value of the gain multiplying the integration value is changed depending on the speed of the moving body. The steering device 100 with such a configuration can output signals indicative of acceleration, deceleration and steering (movement in the horizontal direction) of the moving body are output when the rod-like member is inclined in the forward direction, the rearward direction and the horizontal direction respectively.

As shown in FIG. 3, in this steering device 100, a start period is set so that the amount of movement of the moving body is not changed by a change in the operational force (i.e., a change in the integration value of the operational force) until the speed of the moving body reaches a certain speed from a stopping state. Specifically, when the moving speed of the moving body to be steered is input, the controller 130 determines a duration of the start period in accordance with a value or rule that is defined in advance according to the speed, and then sets the amount in which the moving body is moved at a substantially fixed value regardless of the magnitude of the input operational force until a determined time elapses since the start of movement. This substantially fixed value is preferably the minimum acceleration for moving the moving the moving body. In a case in which the operational force cannot be detected, the moving body is controlled to not move. Furthermore, in a saturated zone, which is obtained when the operational force reaches a value of equal to or greater than a certain value, an output of the sensor is gradually increased as a further operational force is added.

Figure 4:
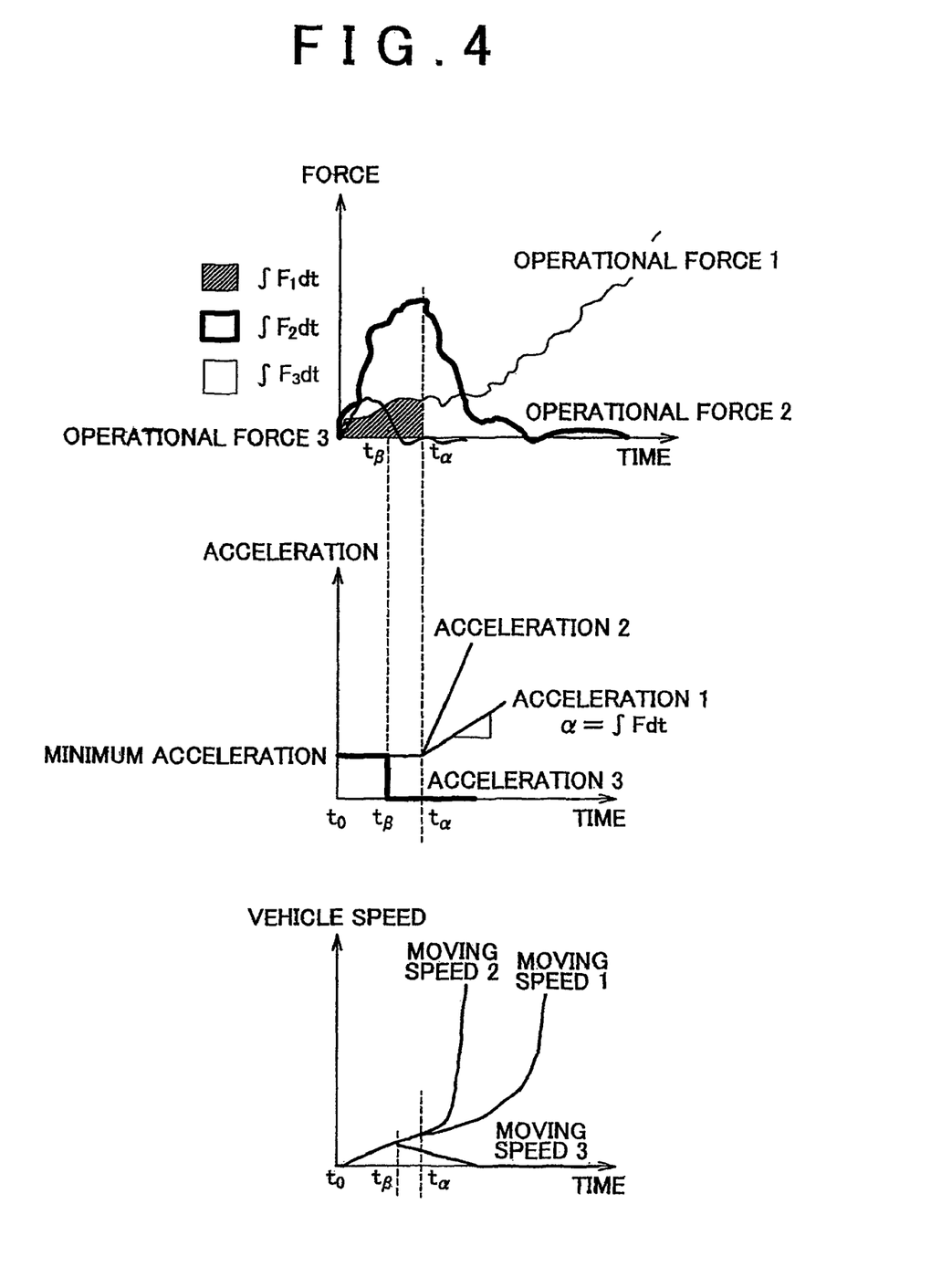
FIG. 4 is a graph showing the relationship among an operational force, applied acceleration and a moving speed that are obtained when the steering device of FIG. 1 is used.
Figure 5:
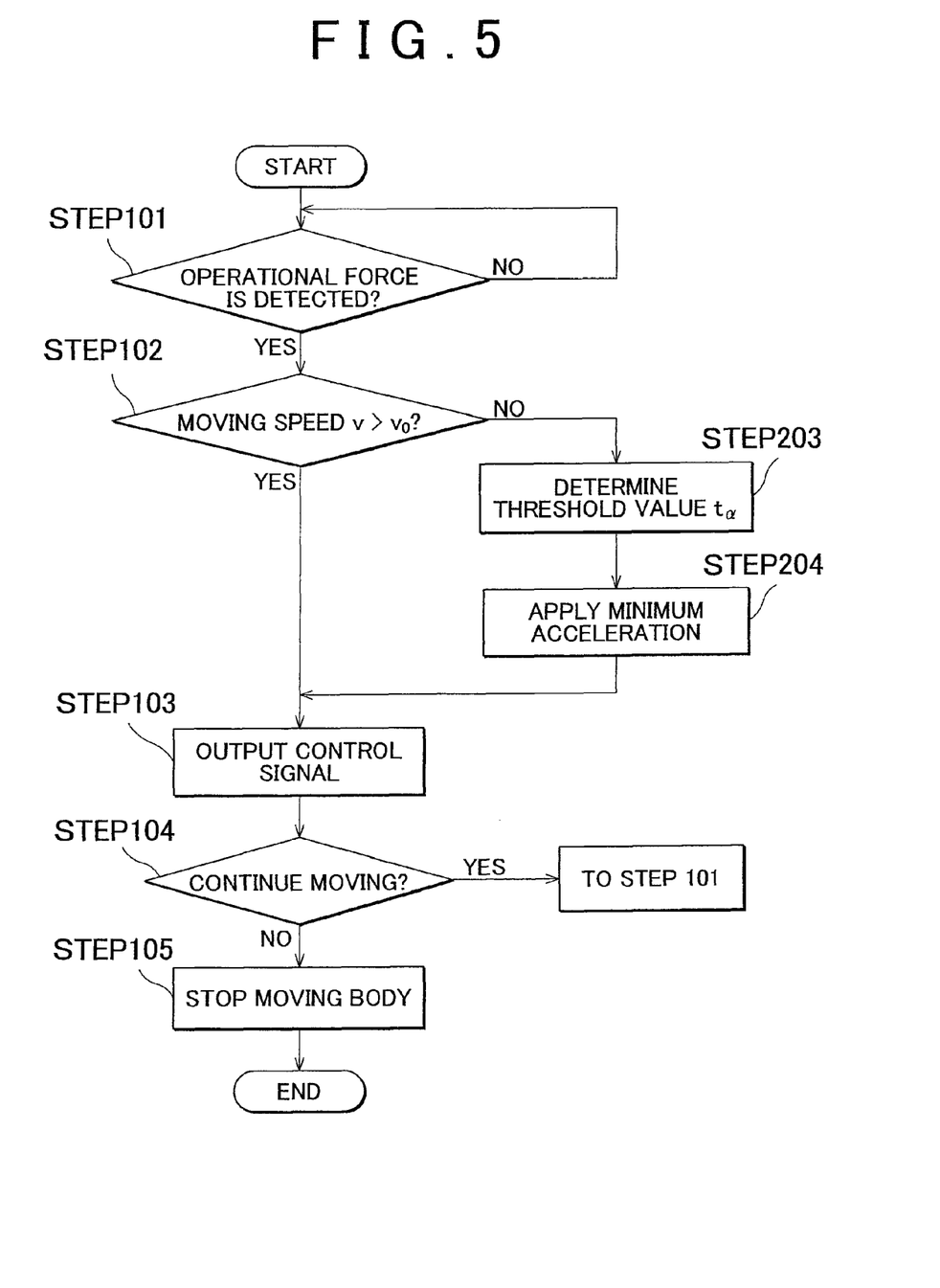
FIG. 5 is a flowchart for controlling a movement of a moving body by using the steering device shown in FIG. 1.

FIG. 4 is a graph showing the relationship among the operational force, applied acceleration and the moving speed that are obtained when controlling the amount of movement of the moving body when a plurality of operational forces are input by moving the moving body using the steering device 100. FIG. 5 is a flowchart for controlling such movement.

FIG. 4 shows changes in the amount of movement (applied acceleration) corresponding to operational forces 1 to 3 and changes in the speed of the moving body moved by the applied acceleration. As shown in FIG. 4, when the operational forces 1, 2 are input, a constant acceleration (minimum acceleration) is obtained until the speed of the moving body reaches time ($t=t_\alpha$) at a certain speed $v_0$ after the moving body starts moving ($t=t_0$). When the operational force 3 is input, and when the operational force does not satisfy a certain value at a time ($t=t_\beta$) before a time $t_\alpha$ (when it is considered that no operation is performed), the acceleration becomes zero, in which case the moving speed of the moving body decelerates naturally and the moving body eventually stops. After the time $t_\alpha$ the acceleration corresponding to the operational force, i.e., the acceleration proportional to the integration value of the operational force, is achieved, whereby the amount of movement of the moving body is determined.

FIG. 5 is a flowchart showing a flow of the control illustrated in FIG. 4. First, in STEP101, whether or not the sensor detects an operational force is determined at extremely short time intervals. When no operational force is obtained, acceleration is not applied, and therefore the processing is kept on standby until an operational force is obtained.

When it is determined that an operational force is obtained, this point of time is taken as the time $t=t_0$, and then the speed of the moving body of this time $t_0$ is acquired and compared with a predetermined reference speed ($v_0$) (STEP102). When the moving speed exceeds $v_0$, the amount of movement of the moving body is calculated by multiplying an integration value of the applied operational force by a predetermined gain, and the obtained amount of movement is output along with the direction of movement in the form of the control signals (STEP103). However, when the moving speed falls below $v_0$, the time $t_\alpha$ is set as a threshold value (STEP203), and control for applying a predetermined acceleration (minimum acceleration) is performed so as to control the amount of movement regardless of the magnitude of detected operational force until the time $t_\alpha$ is passed after the time $t_0$ (STEP204). Then, after the time $t_\alpha$, the processing advances to STEP103 to calculate the amount of movement of the moving body by multiplying the integration value of the applied operational force by the predetermined gain, and the obtained amount of movement is output along with the direction of movement in the form of the control signals. After determining the amount of movement of the moving body in this manner, it is determined whether to stop moving the moving body (STEP104), and when it is not necessary to stop the moving body the processing is returned to STEP101 to continue controlling the amount of movement. When it is necessary to stop the moving body, the moving body is stopped by inputting a predetermined stop signal or the like (STEP105).

Figure 6A:
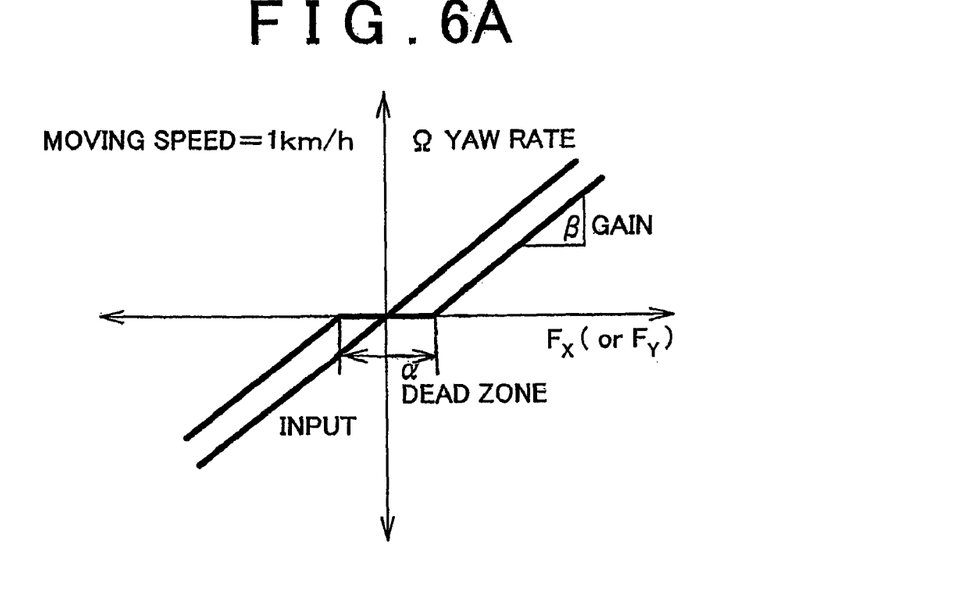
FIG. 6 is a graph showing an example of the relationship between the detected force and a gain corresponding to the force according to the steering device shown in FIG. 1.
Figure 6B:
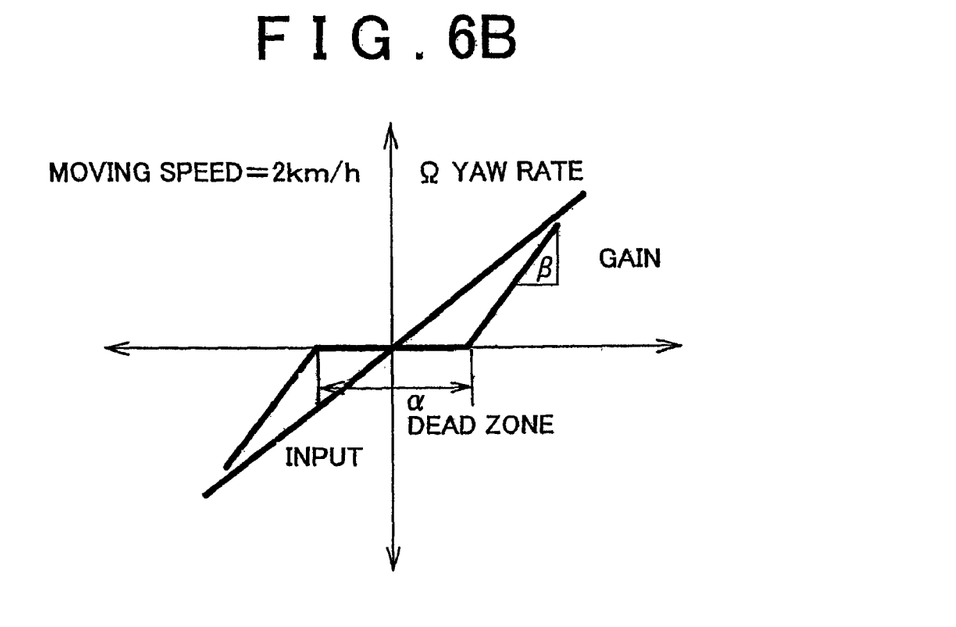

Note in STEP103 described above that for the value of the gain multiplying the integration value of the detected operational force, the dead zone corresponding to the moving speed of the moving body may be set. In this case as well, it is preferred that the magnitude of the gain and the width of the dead zone be changed according to the moving speed of the moving body. FIG. 6 is a graph showing an example of the relationship between the detected force and the gain corresponding to the force. FIG. 6A shows the relationship for a case in which the speed of the moving body is 1 km/h, while FIG. 6B shows the relationship for a case in which the speed of the moving body is 2 km/h. It is preferred that the width of the dead zone be wide when the speed of the moving body is high and that, for outside the dead zone, the magnitude of the value of the gain be slightly large in proportion to the operational force. Note that such the relationship between the operational force and the gain is merely an example, and therefore the invention is not limited to this example. For example, the relationship between the operational force and the gain may be linear or non-linear.

The invention can be used for not only accelerating the moving body but also for decelerating the moving body. Specifically, when the operating body is operated towards a side opposite to the direction of movement of the moving body, the controller applies an acceleration (i.e., deceleration) in a direction opposite to the direction of the movement of the moving body. As with when applying the abovementioned acceleration, a deceleration proportional to the magnitude of the integration value of the operation is applied. In this case as well, it is preferred that the controller determine a width of the dead zone in accordance with a value or rule that is defined in advance according to the moving speed of the operated moving body, and then set the amount in which the moving body is moved at a substantially fixed value regardless of the magnitude of the input operational force until a determined time elapses since the start of movement.

Figure 7:
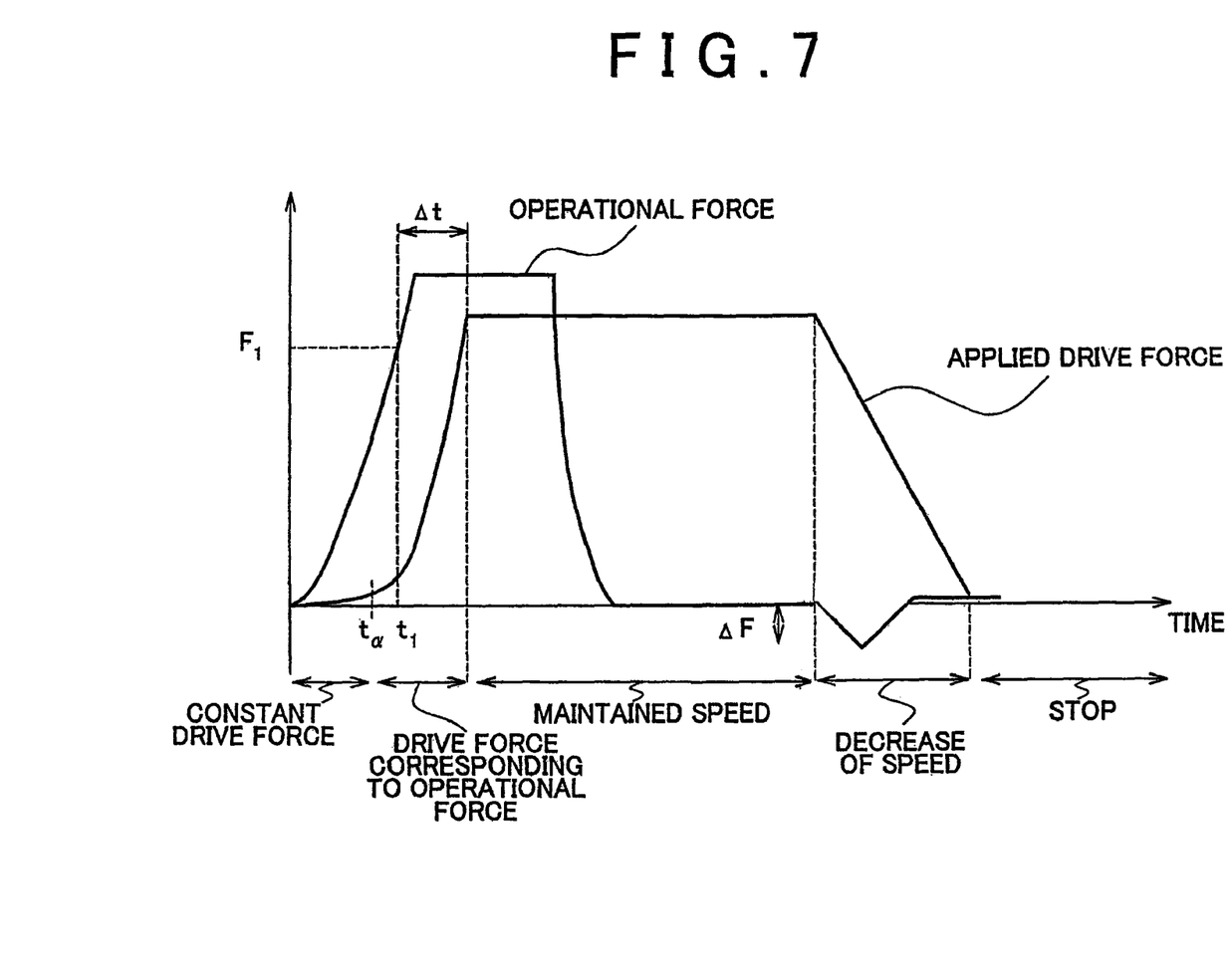
FIG. 7 is a graph showing an example of the speed of the moving body that is obtained when stopping the application of the operational force after operating the operating part of the steering device of FIG. 1 in one direction for a predetermined time period.

Next is described the control of the moving body performed by the steering device 100. FIG. 7 is used to explain an example of controlling the amount of movement of the moving body so as to keep the speed of the moving body constant when a predetermined magnitude or more of a physical quantity is input to the controller for at least a predetermined time period.

FIG. 7 is a graph showing an example of the speed of the moving body in an initial stopping state, the speed being obtained when the operating part 110 of the steering device 100 is operated in one direction for a predetermined time period and thereafter the application of the operational force is stopped. As shown in FIG. 7, when an operational force is obtained in the stopped state, the speed of the moving body falls below the reference speed ($v_0$) as described above. Therefore, the time $t_\alpha$ is set as the threshold value and a predetermined acceleration is applied until the time reaches this time $t_\alpha$. Although an acceleration corresponding to the operational force (e.g., an acceleration proportional to the integration value of the operational force) is applied after the time $t_\alpha$, when it is determined that the operational force exceeds a certain magnitude ($F_1$) at a time $t=t_1$ and that such a state is maintained for a certain time ($\Delta t$) is kept, the controller performs control to apply a substantially fixed drive force to keep the speed of the moving body constant. When such control for keeping the speed constant is performed, the speed of the moving body may be monitored and the drive force for the direction of movement may be applied so as to compensate the deceleration caused by a friction or the like of the moving body.

Furthermore, the control for applying the drive force to keep the moving speed of the moving body constant is continued until the operating part is operated with a certain degree of force in a direction opposite to the direction of movement of moving the moving body, as shown in FIG. 7. When the operating part is operated with a certain degree of force (ΔF) in a direction opposite to the direction of moving the moving body, the controller gradually reduces the drive force to be applied to the moving body.

By performing such control for applying the drive force, the operation load of the operator can be reduced because the operator no longer needs to apply a force to the operating part for a long time to move the moving body by operating the operating part.

Next is described an example of changing the magnitude of the gain in accordance with the speed at which the moving body moves, when controlling the moving body performed by the steering device 100. In this example, the higher the speed of the moving body the more significantly the gain is changed by the controller to increase the responsiveness of the rotational angle (steering angle) when the moving body moves at high speeds.

Figure 8:
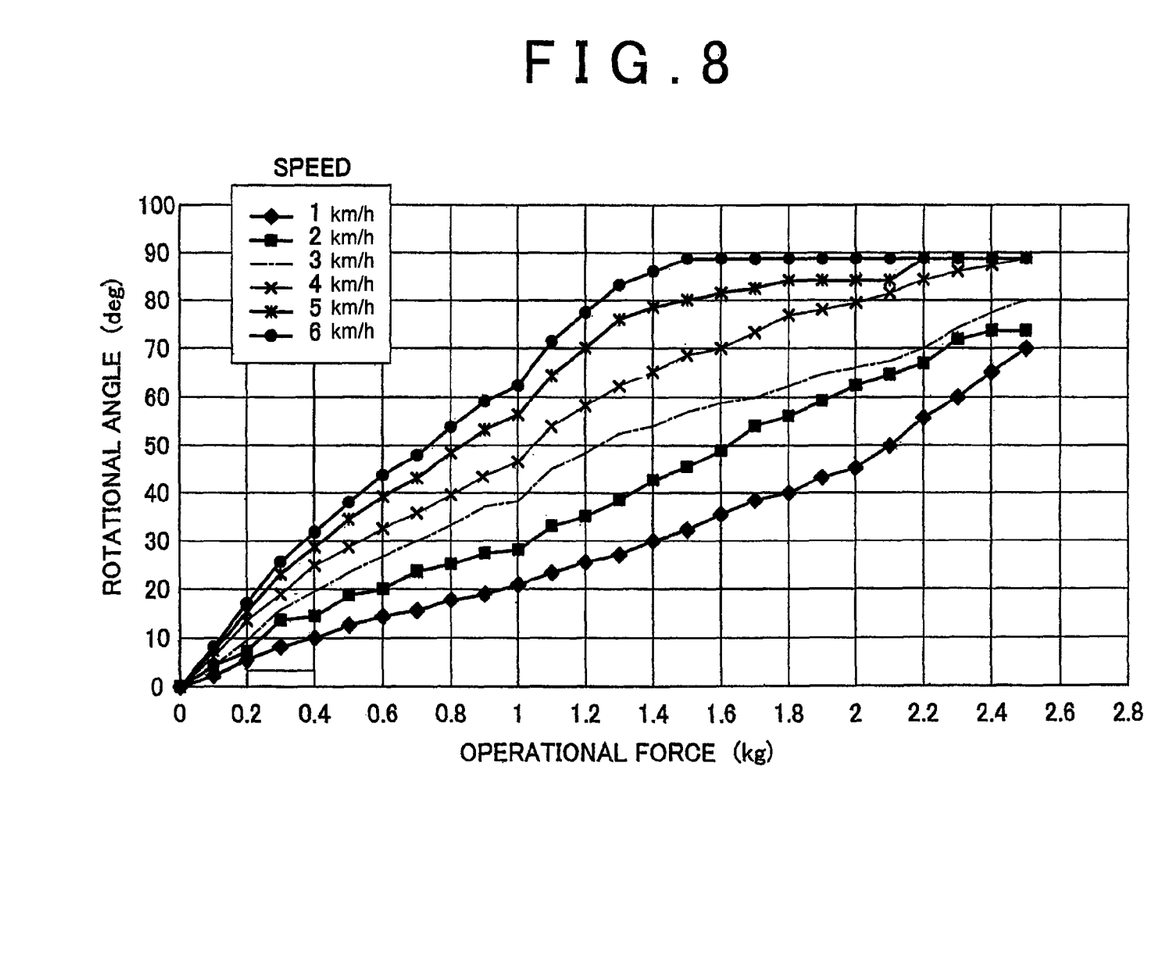
FIG. 8 shows graphs each showing the relationship between the operational force and a rotational angle (amount of movement) corresponding thereto according to the steering device shown in FIG. 1.

FIG. 8 shows graphs each showing the relationship between the operational force and a rotational angle (amount of movement) corresponding thereto. Each of the graphs correspond to the moving speed of the moving body (1 km/h, 2 km/h, . . . , 6 km/h). Even when the same operational force is applied, the higher the moving speed of the moving body the larger the rotational angle is applied, and the greater the operational force the larger the rotational angle is applied. In this manner, the effect of an easy operation that can avoid obstacles during a high-speed operation can be achieved.

Figure 9:
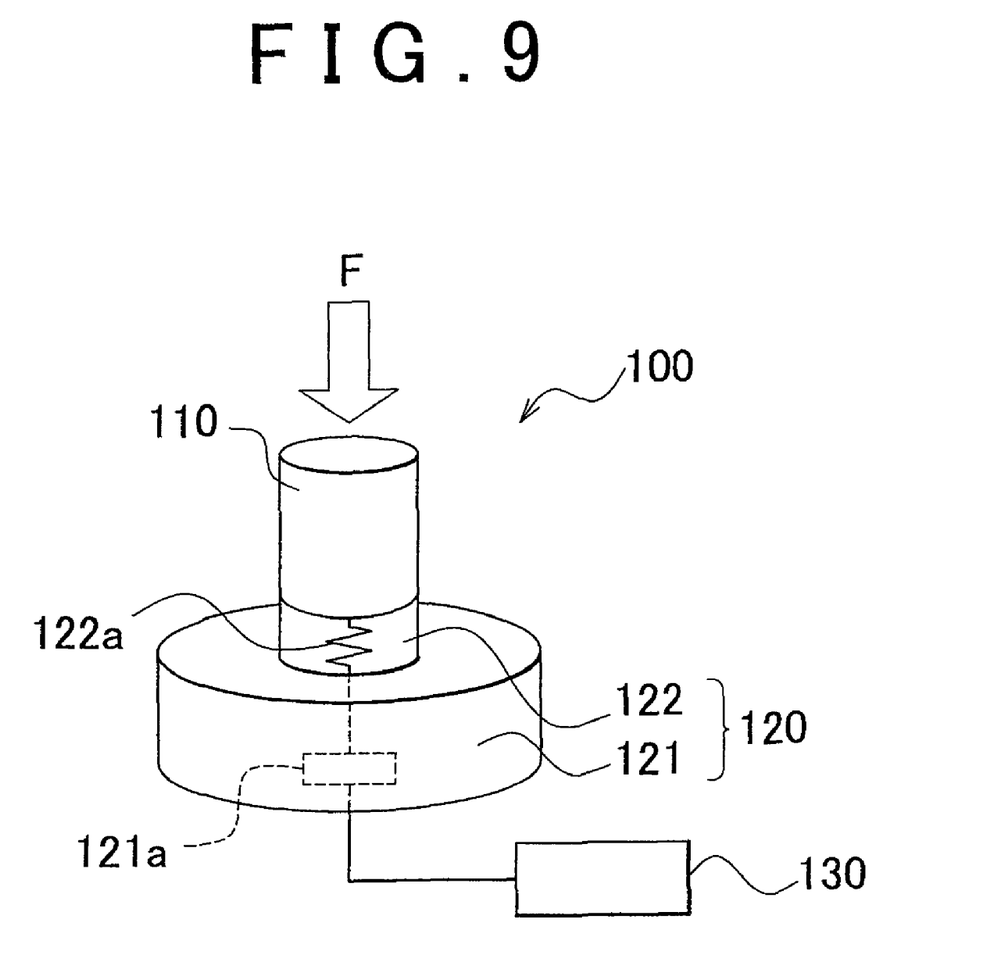
FIG. 9 is a schematic diagram showing a state in which an operational force (F) is applied in a length direction of a rod-like member of an operating part 110 according to the steering device shown in FIG. 1.

Next is described a control that is performed when stopping the moving body using the steering device 100. In a normal stopping operation, the operating part is operated in a direction opposite to the direction of moving the moving body to decelerate the moving body to stop it. However, when performing an emergency stop, such deceleration cannot stop the moving body fast enough. Therefore, when a force of equal to or greater than a certain degree is added in a length direction of the rod-like member of the operating part 110, the controller may control the moving body to stop it. Specifically, as shown in FIG. 9, when the operational force (F) of greater than a predetermined degree is applied in the length direction of the rod-like member of the operating part 110, the elastic body 122 is deformed and then the detector 121a detects an operational force greater than the preset threshold value. When the detector detects an operational force greater than the threshold value, the controller 130 outputs a command for decelerate the moving body to immediately stop the movement of the moving body. The method of deceleration used here may control the movement of the moving body by applying a deceleration of a predetermined magnitude, or may determine the degree of deceleration of the moving body on the basis of the moving speed of the moving body when the abovementioned large operational force is detected, to safely stop the moving body. As a result, in the case of the joystick steering device, the moving body can be brought to an emergency stop when performing an emergency stop (sudden braking), without the need for operating means for performing an emergency stop.

When performing such emergency stop, it is preferred that a subsequent operational force do not affect the forward control of the moving body after the large operational force is detected. However, it is more preferred to keep effectively controlling the moving body in the horizontal direction (steering). In this manner, even when performing an emergency stop, steering can be performed and the operability of the moving body is maintained even when the moving body is stopped.

Although the abovementioned steering device 100 is not particularly provided with a body sensor, the movement of the moving body may be controlled by means of a combination of a signal detected by the body sensor and the operational force of the operating part. Examples of the body sensor include a galvanic skin response sensor or a electromyographic sensor that is provided on the surface of the operating part, and a sensor for measuring the blood pressure and heart rate of the operator. A combination of these sensors can be used. When a detection value of equal to or greater than a given value is detected by such a body sensor, the controller prioritizes a signal obtained from the sensor over the operational force of the operating part, to bring the moving body to an emergency stop. By determining whether to stop the moving body based on the signal acquired from the body sensor as described above, it becomes possible to reduce a delay in a stop timing that affects a delay in the operation performed by the operator.

A second embodiment of the invention is now described. Here, a boarding type moving body 10 in which the above steering device 100 is incorporated is described.

Figure 10:
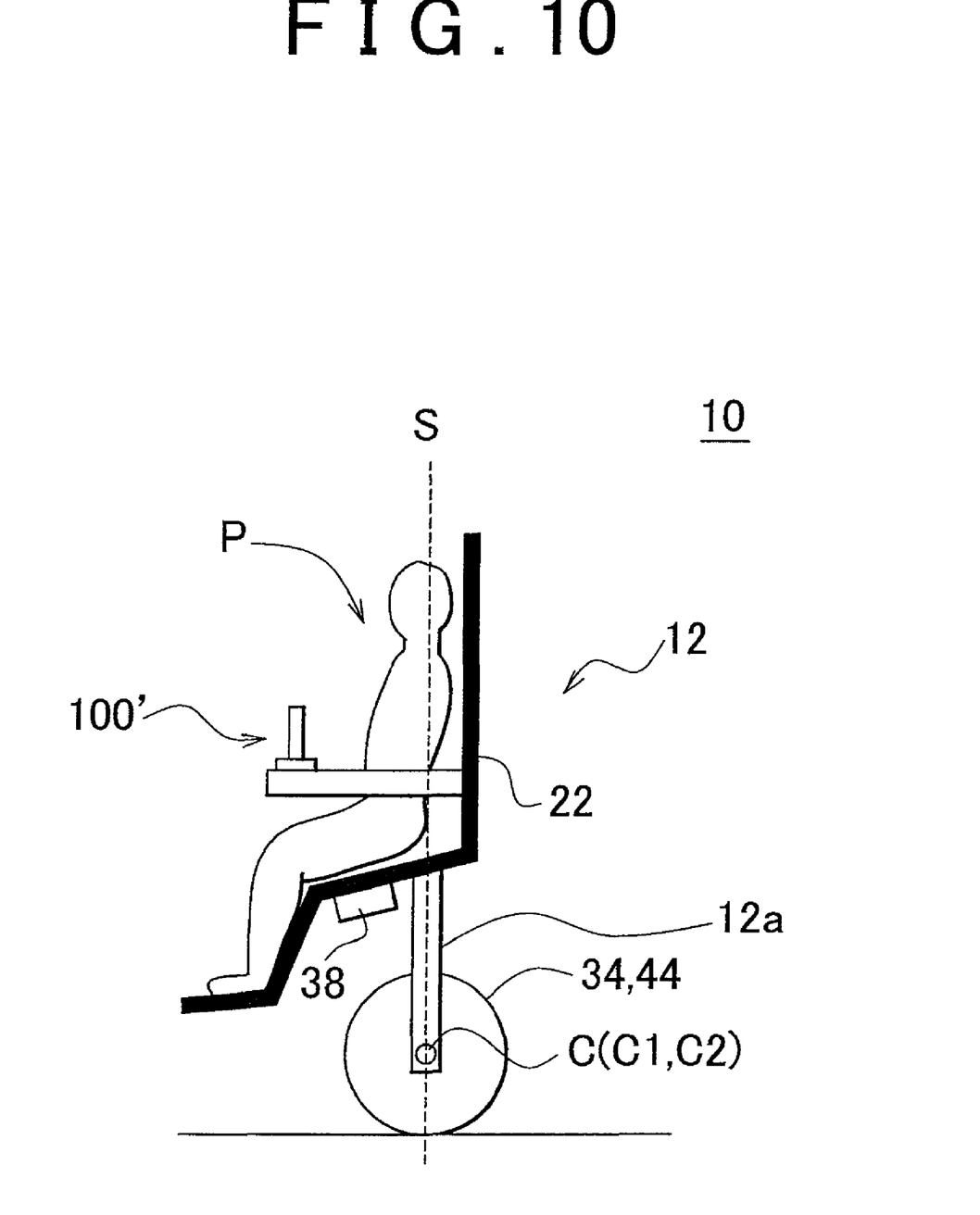
FIG. 10 is a conceptual diagram showing a side of an inverted pendulum type moving body that can be subjected to movement control by an operation performed by an occupant.
Figure 11:
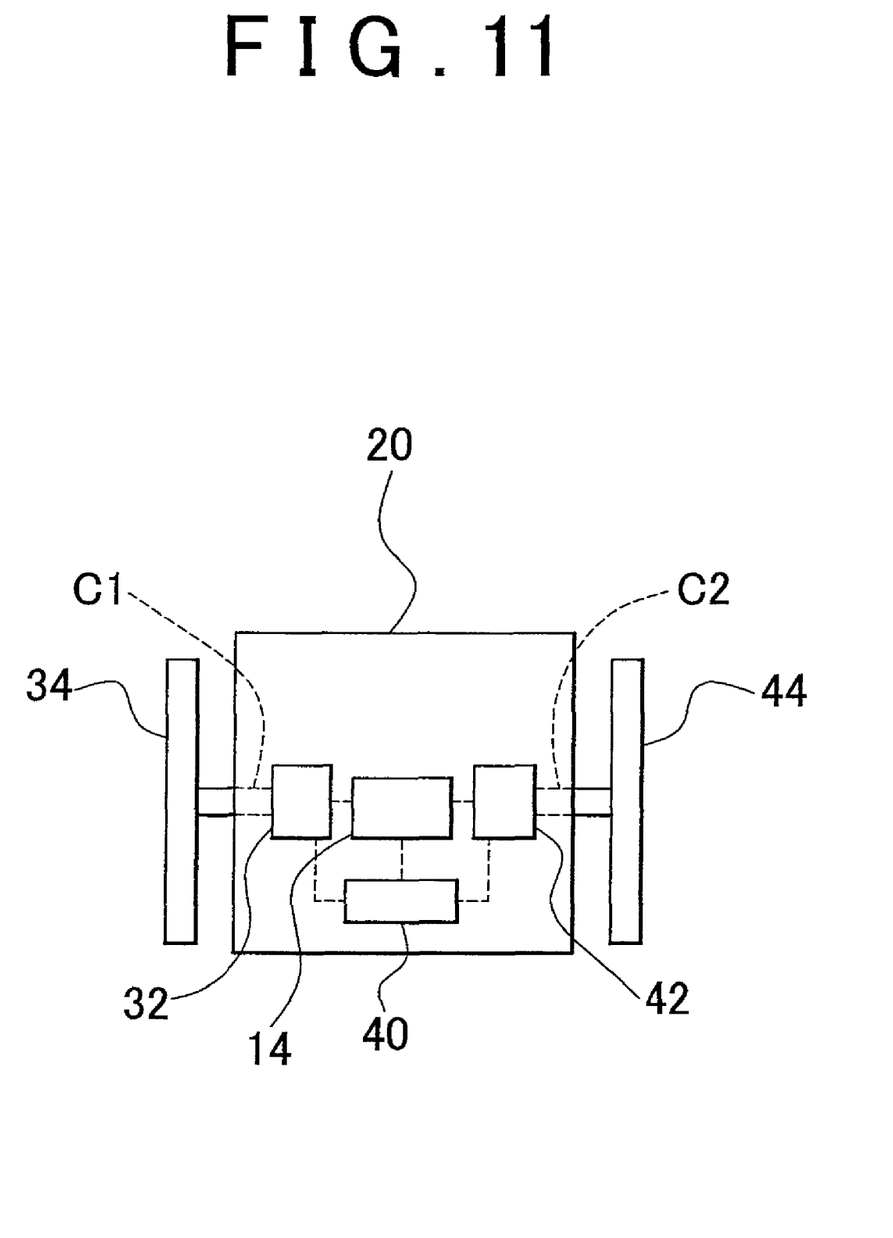
FIG. 11 is a schematic diagram of an internal structure of the moving body 10 shown in FIG. 10.

FIG. 10 is a conceptual diagram in which a conceptual model is used for showing a side of the inverted pendulum type moving body (to be simply referred to as "moving body" hereinafter) 10 that can be subjected to movement control by an operation performed by an occupant P in a state where the occupant P is placed as an operator. FIG. 11 is a schematic diagram of an internal structure of a control box 20 for controlling the moving body 10 shown in FIG. 10. As shown in FIGS. 10 and 11, the moving body 10 has a pair of two wheels 33, 34 facing each other, wherein rotary drive of each wheel is controlled such that the moving body keeps its inverted state while these wheels are in contact with a moving floor part. Note that the same numerals are used to represent the same elements having the same or similar configurations as those described in the above embodiment, and therefore the explanations of these elements are omitted. The detail of this embodiment is described hereinafter.

As shown in FIGS. 10 and 11, the moving body 10 has a moving body main body 12 with a placement table 22 for placing the occupant, and a pair of first and second drive wheels 34, 44 facing each other, the drive wheels being driven to rotate independently with respect to a supporting member 12a that is fixed integrally to the moving body main body 12.

The moving body main body 12 has the placement table 22 configured from a predetermined shape of frame, the abovementioned drive wheels 34, 44 that are driven to rotate via axles C1, C2, the control box 20 for controlling the moving body (not shown in FIG. 10), a steering device 100' provided in a position where it can be operated by the operator on the placement table 22, and a gyroscope 38 for acquiring a degree of inclination of the placement table 22.

The inside of the control box 20 is provided with, as shown in FIG. 11, motors 32, 42 for driving the drive wheels around the axles C1, C2, a moving body controller 14 for controlling the rotary drive operation of the motors, and a battery 40 for supplying electric power to the motor to drive it.

The placement table 22 has a flat board-like seat on which the occupant P sits, a backrest for supporting the back of the occupant, a leg supporting part and a feet placement part. In addition, the backrest is provided with an armrest extending in a front-back direction on a side of the occupant P, and the steering device 100' is disposed above the armrest.

The steering device 100' is disposed on the side of the occupant P who boards on the placement table 22, and, as with the embodiment described above, has the operating part 110 having a rod-like member, a detector for detecting the operational force and operation direction of the operational force, and the base part 120 to which the operating part is fixed via the elastic body. A signal of the detector is input to the moving body controller 14, which is described hereinafter, and the direction of moving the moving body 10 and the amount of movement of the moving body 10 are recognized by the moving body controller 14. Specifically, unlike the example described above, in this example the moving body controller 14 incorporated in the moving body main body is used in place of the controller of the steering device. Note that the detail of the internal structure of the steering device 100' is substantially the same as that described in the above embodiment, and therefore the explanation thereof is omitted.

The moving body controller 14, a computer having therein storage regions such as an arithmetic processing part and memory, stores therein a predetermined program for determining the amount of driving the drive wheels based on the input signal and map information related to a region to move the moving body. Accordingly, the moving body controller 14 can control the rotary drive operation of the motors 32, 42 in response to the operation on the steering device 100' (operating part 110) performed by the occupant, to move the moving body 10 forward or backward, to the right or left, stop the moving body 10 or turn the moving body 10 counterclockwise or clockwise. More specifically, the motors 32, 42 drive to rotate the first and second drive wheels 34, 44 based on an electric signal transmitted from the moving body controller 14, and then send a feedback on a current rotary drive amount to the moving body controller 14 in real time. The moving body controller 14 adjusts the amount of driving the motors 32, 42 on the basis of the signal on the feedback. The moving body controller 14 can consequently perform so-called inverting control for moving or stopping the moving body while keeping the inverted state of the moving body main body 12 as described hereinafter. Moreover, the moving body 10 can be turned by changing the drive amount of the motors 32, 42.

Each of the motors 32, 42 is provided with a temperature sensor (not shown) for detecting that the motor enters an overheated state due to supply of electric power. This temperature sensor detects the overheated state and outputs a resulting detection signal to the controller as described hereinafter. Accordingly, it is possible to avoid such a situation where the motor cannot output the maximum torque.

The gyroscope 38 detects how much it is inclined from its vertically standing original position within a predetermined time period, converts the detected angular speed into an electric signal, and outputs the obtained signal. The amount of inclination of the moving body 10 can be obtained by integrating the inclination angular speed of the moving body that is detected within a short time interval while moving the moving body 10. Note that the electric signal that is output from the gyroscope is transmitted to the controller after noise thereof is removed by a filter (not shown).

Although not shown, the moving body 10 may have various sensor (optical sensors) for optically recognizing obstacles and the shape and the like of the floor on which the moving body moves. As such sensors, it is preferred to use, for example, a sensor that detects the shape of the floor at the front on which the moving body moves, by emitting an infrared laser to detect reflected light. Use of such a sensor can obtain a step existing on the floor, the height of a projecting part such as an obstacle, and the distance between the current position of the moving part 10 and the projecting part.

Next is described control performed by the moving body controller 14 for maintaining the inverted state of the moving body 10. When an angle between a straight line S passing through an axle C and a straight line connecting the barycentric position of the moving body 10 to the axle C is taken as a inclination angle η, the straight line S extending vertically from the point where the drive wheels of the moving body 10 contacts with the floor, the moving body controller 14 controls the rotary drive of the first and second drive wheels 34, 44 so that the inclination angle η becomes a target inclination angle (e.g. η=0 degree). The moving body with such a configuration is controlled such that the first and second drive wheels 34, 44 are moved forward in a direction in which the moving body is inclined and that the barycentric position of the moving body is returned vertically above the axle C. As a result, appropriate torque is applied to the pair of drive wheels contacting with the floor, whereby the inverted state of the moving body main body is kept such that the inclination angle established with respect to the vertical direction does not exceed a certain value, and also the movement control is performed to maintain this inverted state.

Consequently, the occupant operates the steering device 100' to change the inclined state of the moving body, whereby a predetermined inverted state of the moving body main body 12 is continuously kept. As a result, forward and rearward movement operations can be executed. Note that the inclination angle η is obtained by the gyroscope 38 provided in the moving body 10.

The moving body with such a configuration keeps its inverted state in accordance with the magnitude of the operational force obtained from the occupant's operation of the operating part, and the amount of movement and the direction of movement are determined. In this case as well, until the speed of the moving body reaches a certain speed from the stopping state, the start period is set so as not to change the amount of movement of the moving body that is caused by a change in the operational force (i.e., a change in the integration value of the operational force). The moving body controller 14 determines a duration of the start period in accordance with a value or rule that is defined in advance according to the moving speed of the moving body, and then sets the amount in which the moving body is moved at a substantially fixed value regardless of the magnitude of the input operational force until a determined time elapses since the start of movement. As a result, sufficient responsiveness and operability for controlling the movement of the moving body can be secured while controlling the movement of the moving body by an intuitive operation performed by the operator.

Furthermore, according to the inverted pendulum type moving body with the abovementioned steering device incorporated therein, the abovementioned width of the dead zone and the magnitude of the gain may be changed in accordance with the degree of inclination and the position of the occupant on the placement table. Specifically, according to the inverted pendulum type moving body, the inverting control is performed based on the inclination angle obtained by the gyroscope, and thus an external force from the outside (disturbance) needs to be compensated. Therefore, it is more preferred to provide a pressure-sensitive sensor or an acceleration sensor on the placement table to measure an external force applied to the moving body main body and then to perform the inverting control and movement control in consideration of the external force. Specifically, considered is use of a method of adjusting the width of the dead zone resulting from the movement control, a saturated amount, and a set order of gains. Such control is effectively performed when the abovementioned external force is applied, and when the occupant changes sitting in the moving body.

This embodiment has used the inverted pendulum type moving body to describe an example of the moving body in which the steering device is incorporated, but the invention is not limited to this embodiment. Specifically, the invention can be applied to a stable moving body that is moved by four drive wheels and a moving body that is moved by leg movement.

Moreover, according to the invention, it is not necessary to incorporate the steering device in the moving body. Therefore, the steering device and the moving body may be configured independently. For example, in a steering system for wirelessly steering a moving body (e.g., a boarding type moving body), when controlling the movement of the moving body, the abovementioned steering device can be used to operate the movement of the moving body based on an intuitive operation of the operator so that sufficient responsiveness and operability can be secured.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A movement control device for controlling a motorized vehicle having moving means, the movement control device comprising:
    an operating part;
    a detecting part that detects a physical quantity based on a magnitude and direction of a force applied to the operating part; and
    a controller that drives the moving means based on the physical quantity detected by the detecting part and controls an amount of movement and a direction of movement of the motorized vehicle,
    wherein the controller is programmed to set start period from when the speed of the motorized vehicle is zero to when the speed of the motorized vehicle reaches a first speed and a maintained speed period during which the motorized vehicle is moving at a second speed that is higher than the first speed, and the controller controls the motorized vehicle so that the acceleration and turning angular acceleration of the motorized vehicle are equal to or lower than a predetermined value in the start period and maintained speed period, and wherein the controller controls the motorized vehicle so that an amount of movement of the motorized vehicle is proportional to an integration of the applied force outside the start period and the maintained speed period.

2. The movement control device according to claim 1, wherein in a case in which the physical quantity of equal to or greater than a predetermined magnitude is input to the controller for at least a predetermined time period when the motorized vehicle moves at a predetermined speed or higher, the amount of movement is controlled to keep the speed of the motorized vehicle at a predetermined rate.

3. The movement control device according to claim 2, wherein the movement control device controls the amount of movement to keep the speed of the motorized vehicle at a predetermined rate until the physical quantity of equal to or greater than a predetermined value is input to the controller in a direction opposite to a direction in which the motorized vehicle moves.

4. The movement control device according to claim 1, wherein the physical quantity includes an integration value of the force applied to the operating part.

5. The movement control device according to claim 1, wherein the controller controls the amount of movement and the direction of movement, based on a value obtained by multiplying the input physical quantity by a specific gain and changes the magnitude of the gain in accordance with a speed at which the motorized vehicle moves.

6. The movement control device according to claim 5, wherein when the input physical quantity is equal to or greater than a certain magnitude, the controller changes the gain more significantly as the speed of the motorized vehicle becomes higher.

7. The movement control device according to claim 1, wherein the operating part has a graspable rod-like member that is fixed to the detecting part via an elastic body, and the detecting part detects the physical quantity based on a magnitude and a direction of a force applied to the elastic body by operating the rod-like member.

8. The movement control device according to claim 7, wherein the controller stops the motorized vehicle when the force of equal to or greater than a certain magnitude is applied in a length direction of the operating part.

9. The movement control device according to claim 1, wherein a body sensor is provided on a surface of the operating part, and the controller determines whether to stop the motorized vehicle on the basis of a signal acquired by the body sensor.

10. A motorized vehicle with a capacity to carry at least one person that can be steered by an operation of a movement control device performed by an occupant, the motorized vehicle comprising:
    moving means;
    an operating part operated by the occupant;
    a detecting part that detects a physical quantity based on a magnitude and direction of a force applied to the operating part; and
    a controller that drives the moving means based on the physical quantity detected by the detecting part and controls an amount of movement and a direction of movement of the motorized vehicle,
    wherein the controller is programmed to set a start period from when the speed of the motorized vehicle is zero to when the speed of the motorized vehicle reaches a first speed and a maintained speed period during which the motorized vehicle is moving at a second speed that is higher than the first speed, and the controller controls the motorized vehicle so that the acceleration and turning angular acceleration of the motorized vehicle are equal to or lower than a predetermined value in the start period and maintained speed period, and wherein the controller controls the motorized vehicle so that an amount of movement of the motorized vehicle is proportional to an integration of the applied force outside the start period and the maintained speed period.

11. The motorized vehicle according to claim 10, wherein the physical quantity includes an integration value of the force applied to the operating part.

12. The motorized vehicle according to claim 10, wherein in a case in which the physical quantity of equal to or greater than a predetermined magnitude is input to the controller for at least a predetermined time period when the motorized vehicle moves at a predetermined speed or higher, the amount of movement is controlled to keep the speed thereof at a predetermined rate.

13. The motorized vehicle according to claim 12, wherein the controller controls the amount of movement to keep the speed of the motorized vehicle at a predetermined rate until the physical quantity of equal to or greater than a predetermined value is input to the controller in a direction opposite to a direction in which the motorized vehicle moves.

14. The motorized vehicle according to claim 10, wherein the controller controls the amount of movement and the direction of movement based on a value obtained by multiplying the input physical quantity by a specific gain and changes the magnitude of the gain in accordance with a speed at which the motorized vehicle moves.

15. The motorized vehicle according to claim 14, wherein the controller changes the gain more significantly as the speed of the motorized vehicle becomes higher.

16. The motorized vehicle according to claim 10, wherein the operating part has a graspable rod-like member that is fixed to the detecting part via an elastic body, and the detecting part detects the physical quantity based on a magnitude and a direction of a force applied to the elastic body by operating the rod-like member.

17. The motorized vehicle according to claim 16, wherein the controller stops the motorized vehicle when the force of equal to or greater than a certain magnitude is applied in a length direction of the operating part.

18. The motorized vehicle according to claim 10, wherein a body sensor is provided on a surface of the operating part, and the controller determines whether to stop the motorized vehicle on the basis of a signal acquired from the body sensor.

19. The motorized vehicle according to claim 10, wherein the moving means is wheel-type moving means that is driven by a given torque.

20. A movement control method of controlling a motorized vehicle having moving means, the movement control method comprising:
   detecting a physical quantity based on a magnitude and a direction of a force applied to an operating part;
   controlling the moving means so as to change at least one of speed, acceleration, turning angle, turning angular speed, and turning angular acceleration of the motorized vehicle according to the detected physical quantity,
   wherein, in the controlling step, the controller is programmed to set a start period from when the speed of the motorized vehicle is zero to when the speed of the motorized vehicle reaches a first speed and a maintained speed period during which the motorized vehicle is moving at a second speed that is higher than the first speed, and the motorized vehicle is controlled so that the acceleration and turning angular acceleration of the motorized vehicle are equal to or lower than a predetermined value in the start period and maintained speed period, and wherein the controller controls the motorized vehicle so that an amount of movement of the motorized vehicle is proportional to an integration of the applied force outside the start period and the maintained speed period.

21. The movement control method according to claim 20, wherein the control steps control the amount of movement and the direction of movement based on a value obtained by multiplying the detected physical quantity by a specific gain and
   change the magnitude of the gain in accordance with a speed at which the motorized vehicle moves.

22. The movement control method according to claim 21, wherein the control steps change the gain more significantly as the speed of the motorized vehicle becomes higher.

23. The movement control method according to claim 22, further comprising:
   determining whether the motorized vehicle moves at a speed of equal to or higher than a predetermined speed; and
   a third control step of controlling the amount of movement to keep the speed of the motorized vehicle at a predetermined rate, when determination is made that the motorized vehicle moves at the speed equal to or higher than the predetermined speed and when the physical quantity of equal to or greater than a predetermined magnitude is input to the controller for at least a predetermined time period.

* * * * *